United States Patent
Ginsberg et al.

(10) Patent No.: US 7,516,216 B2
(45) Date of Patent: Apr. 7, 2009

(54) GENERATING TRAFFIC FOR TESTING A SYSTEM UNDER TEST

(75) Inventors: Errol Ginsberg, Malibu, CA (US); Victor Alston, Agoura Hills, CA (US); Aloysius Arthur Wild, III, Thousand Oaks, CA (US); Ankur Sheth, Westlake Village, CA (US); Winston Liu, Woodland Hills, CA (US); Ram Periakaruppan, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 457 days.

(21) Appl. No.: 11/462,351

(22) Filed: Aug. 3, 2006

(65) Prior Publication Data

US 2007/0025261 A1   Feb. 1, 2007

Related U.S. Application Data

(63) Continuation-in-part of application No. 10/646,983, filed on Aug. 21, 2003, which is a continuation-in-part of application No. 09/968,432, filed on Oct. 1, 2001, now Pat. No. 7,194,535.

(51) Int. Cl.
*G06F 15/16* (2006.01)
*G06F 17/50* (2006.01)

(52) U.S. Cl. .................................... 709/224; 703/13
(58) Field of Classification Search ................ 709/224; 703/13
See application file for complete search history.

(56) References Cited

U.S. PATENT DOCUMENTS

| | | | |
|---|---|---|---|
| 5,247,517 A | 9/1993 | Ross et al. | |
| 5,343,463 A | 8/1994 | van Tetering et al. | |
| 5,477,531 A | 12/1995 | McKee | |
| 5,535,338 A | 7/1996 | Krause et al. | |
| 5,568,471 A | 10/1996 | Hershey et al. | |
| 5,590,285 A | 12/1996 | Krause et al. | |
| 5,600,632 A | 2/1997 | Schulman | |
| 5,657,438 A | 8/1997 | Wygodny | |
| 5,671,351 A | 9/1997 | Wild | |
| 5,761,486 A | 6/1998 | Watanabe | |
| 5,787,253 A | 7/1998 | McCreery et al. | |
| 5,838,919 A * | 11/1998 | Schwaller et al. | ........... 709/224 |
| 5,878,032 A | 3/1999 | Mirek et al. | |

(Continued)

FOREIGN PATENT DOCUMENTS

EP   0895375   2/1999

OTHER PUBLICATIONS

Business Wire. "Ixia's Web Stressing and In-Service Monitoring Products Names Best of Show Finalist at NetWorld+Interop 2001, Atlanta", Sep. 10, 2001, 2 pages.*

(Continued)

*Primary Examiner*—George C Neurauter, Jr.
(74) *Attorney, Agent, or Firm*—SoCal IP Law Group LLP; Steven C. Sereboff; John E. Gunther

(57) ABSTRACT

Methods and apparatus for testing performance of an system under test are disclosed. The system under test is loaded with simulated traffic which may be generated from a single test port. The performance of the system under test under load may be tested.

46 Claims, 3 Drawing Sheets

U.S. PATENT DOCUMENTS

| | | | |
|---|---|---|---|
| 5,881,237 A * | 3/1999 | Schwaller et al. | 709/224 |
| 5,905,713 A | 5/1999 | Anderson et al. | |
| 5,937,165 A * | 8/1999 | Schwaller et al. | 709/224 |
| 5,974,237 A | 10/1999 | Shurmer et al. | |
| 6,028,847 A | 2/2000 | Beanland | |
| 6,044,091 A | 3/2000 | Kim | |
| 6,061,725 A * | 5/2000 | Schwaller et al. | 709/224 |
| 6,108,800 A | 8/2000 | Asawa | |
| 6,122,670 A | 9/2000 | Bennett et al. | |
| 6,148,277 A | 11/2000 | Asava | |
| 6,157,955 A | 12/2000 | Narad et al. | |
| 6,172,989 B1 | 1/2001 | Yanagihara et al. | |
| 6,173,333 B1 | 1/2001 | Jolitz | |
| 6,189,031 B1 | 2/2001 | Badger | |
| 6,233,256 B1 | 5/2001 | Dieterich et al. | |
| 6,279,124 B1 | 8/2001 | Brouwer | |
| 6,321,264 B1 | 11/2001 | Fletcher | |
| 6,345,302 B1 | 2/2002 | Bennett et al. | |
| 6,360,332 B1 | 3/2002 | Weinberg | |
| 6,363,056 B1 | 3/2002 | Beigi et al. | |
| 6,397,359 B1 * | 5/2002 | Chandra et al. | 714/712 |
| 6,401,117 B1 | 6/2002 | Narad | |
| 6,408,335 B1 * | 6/2002 | Schwaller et al. | 709/224 |
| 6,421,730 B1 | 7/2002 | Narad | |
| 6,434,513 B1 * | 8/2002 | Sherman et al. | 702/186 |
| 6,446,121 B1 | 9/2002 | Shah | |
| 6,507,923 B1 | 1/2003 | Wall et al. | |
| 6,545,979 B1 | 4/2003 | Poulin | |
| 6,601,098 B1 | 7/2003 | Case | |
| 6,621,805 B1 | 9/2003 | Kondylis et al. | |
| 6,625,648 B1 * | 9/2003 | Schwaller et al. | 709/224 |
| 6,625,689 B2 | 9/2003 | Narad | |
| 6,662,227 B2 * | 12/2003 | Boyd et al. | 709/224 |
| 6,708,224 B1 * | 3/2004 | Tsun et al. | 719/316 |
| 6,763,380 B1 * | 7/2004 | Mayton et al. | 709/224 |
| 6,789,100 B2 | 9/2004 | Nemirovsky | |
| 6,950,405 B2 | 9/2005 | Van Gerrevink | |
| 7,006,963 B1 * | 2/2006 | Maurer | 703/21 |
| 7,010,782 B2 * | 3/2006 | Narayan et al. | 717/124 |
| 2002/0080781 A1 | 6/2002 | Gustavsson | |
| 2003/0009544 A1 | 1/2003 | Wach | |
| 2003/0033406 A1 * | 2/2003 | John et al. | 709/224 |
| 2003/0043434 A1 | 3/2003 | Brachmann et al. | |
| 2003/0231741 A1 | 12/2003 | Rancu et al. | |

OTHER PUBLICATIONS

Business Wire. "Spirient Communications TeraMetrics and NetIQ's Chariot Work Together to Create First Complete Network Performance Analysis Solution", Sep. 25, 2000, 2 pages.*

Business Wire. "NetIQ's Chariot 4.0 Goes Internet-Scale; ASPs and Service Providers Can Conduct Tests With Up to 10,000 Connections; New Visual Test Designer Simplifies Testing of All Sizes", Oct. 23, 2000, 1 page.*

"Caw Networks Unveils New Web-Stressing Appliance", press release from Caw Networks, Inc., Mar. 5, 2001, 2 pages.*

Lori MacVittie. "Online Only: CAW's WebReflector Makes Load-Testing a Cakewalk", Network Computing, Sep. 3, 2001, 2 pages.*

Caw Networks, Inc. and Foundry Networks, Inc. "Caw Networks Performance Brief: Caw Networks and Foundry Networks 140,000 Transactions per Second Assessment", Sep. 2001, 1 page.*

PRNewsWire. "Caw Network Doubles Performance of Real-World Capacity Assessment Applicance Suite: WebAvalanche and WebReflector Now Generate and Respond to 20,000+ HTTP requests per Second With Over One Million Open Connections", Sep. 10, 2001, 2 pages.*

Business Wire. "Reminder/Caw Networks to Spotlight WebAvalanche 2.0 and WebReflector At Networld+Interop", May 8, 2001, 2 pages.*

Ron J. Kovac. "Validate your equipment performance—Netcom Systems' SmartBits—Hardware Review—Evaluation", Communications News, May 2000, 2 pages.*

Cooper, Session traces: an enhancement to network simulator, Performance, computing and Communications Conference, Scottsdale, AZ, Feb. 10, 1999.

Ye, Tao, Network Management and Control Using collaborative On-Line Simulation, Rensselaer Polytechnic Institute, 2003.

Ye, Tao, Large-Scale Network Parameter Configuration Using an On-line Simulation Framework, Technical report, ECSE Department, Rensselear Polytechnic Institute, 2002.

San-Qi Li, et al., SMAQ: A Measurement-Based Tool for Traffic Modeling and Queuing Analysis Part I, IEEE Communications Magazine, Aug. 1, 1998.

San-Qi Li, et al., SMAQ: A Measurement-Based Tool for Traffic Modeling and Queuing Analysis Part II, IEEE Communications Magazine, Aug. 1, 1998.

Marchette, A Statistical Method for Profiling Network Traffic, USENIX, Apr. 1999.

* cited by examiner

GENERATING TRAFFIC FOR TESTING A SYSTEM UNDER TEST

RELATED APPLICATION INFORMATION

This patent is a continuation-in-part of application Ser. No. 10/646,983 filed Aug. 21, 2003, which is a continuation-in-part of application Ser. No. 09/968,432 filed Oct. 1, 2001, both of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to methods and systems for testing network communications devices, systems and applications.

2. Description of the Related Art

Traditional network routing and switching devices are stateless in that these devices make decisions based on information that is contained within headers without maintaining any information about previous packets. They do not maintain any type of connection to the client or server at either end of the TCP transaction.

True TCP sessions contain a feedback mechanism. For example, a TCP receiver sends acknowledgement packets to a TCP sender that advertise a window size to the TCP sender that inform the TCP sender the size of the receiver's receive buffer. The sender uses the advertised window size to control the flow of packets sent to the receiver. This mechanism causes the flow of incoming traffic to vary as a function of receiver performance. For instance, as a TCP receiver becomes overloaded, the rate of removing and processing packets from its TCP receive buffer decreases. As a result, the window size advertised to the sender decreases, and the TCP sender slows the flow of packets sent to the receiver. In addition, the mechanism can generate redundant data. For example, if a TCP receiver receives an out-of-sequence packet, the receiver will send a duplicate acknowledgement to the sender indicating that an out of sequence packet was received.

Multiprotocol Label Switching (MPLS) is a data-carrying mechanism which emulates some properties of a circuit-switched network over a packet-switched network. MPLS operates at an OSI Model layer that is generally considered to lie between traditional definitions of Layer 2 (data link layer) and Layer 3 (network layer), and thus is often referred to as a "Layer 2.5" protocol. It was designed to provide a unified data-carrying service for both circuit-based clients and packet-switching clients which provide a datagram service model. It can be used to carry many different kinds of traffic, including IP packets, as well as native ATM, SONET, and Ethernet frames. To the extent terms in this patent involve MPLS, definitions and information concerning the terms may be obtained from RFC 3031 and 3032.

MPLS works by prepending packets with an MPLS header, containing one or more labels. This is called a label stack. The labels typically identify a specific path for a given sequence of packets. Devices that function as ingress and/or egress routers into an MPLS network are often called PE (Provider Edge) routers. Devices that function only as transit routers are similarly called P (Provider) routers. When an unlabeled packet enters the ingress router and needs to be passed on to an MPLS tunnel, the router first determines the forwarding equivalence class the packet should be in, and then inserts one (or more) labels in the packet's newly created MPLS header. The packet is then passed on to the next hop router for this tunnel. Within the MPLS network., the contents of the packet below the MPLS label stack are not examined. The forwarding/switching of the packet is done based on the contents of the labels.

Label Distribution Protocol (LDP) is a protocol in which two label-switched routers (LSR) exchange label mapping information. The two LSRs are called LDP peers and the exchange of information is bi-directional. LDP is used to build and maintain LSR databases that are used to forward traffic through MPLS networks.

RSVP-TE labels are used in the Resource Reservation Protocol—Traffic Extension, which allows establishment of label switched paths in an MPLS network. RSVP is a protocol that supports the reservation of resources across an IP network.

MP-BGP labels are labels used in the multiprotocol (MP) extensions of the Border Gateway Protocol (BGP), which is the core routing protocol of the Internet.

MPLS VPN is a family of methods for harnessing the power of Multiprotocol Label Switching (MPLS) to create Virtual Private Networks (VPNs). MPLS is well suited to the task as it provides traffic isolation and differentiation without substantial overhead.

A layer 3 MPLS VPN, also known as L3VPN, combines enhanced BGP signaling, MPLS traffic isolation and router support for VRFs (Virtual Routing/Forwarding) to create a virtual network. This solution is more scalable and less costly than classic provider-based frame relay or ATM-based networks, or IPSec-based VPNs. Layer 3 MPLS VPNs also support Quality of Service.

A layer 2 MPLS VPN, also known as L2VPN, is a point-to-point pseudowire service. It can be used to replace existing physical links. The specification is based on the Martini drafts, which define methods to transport layer 2 packets across MPLS networks, and methods to encapsulate transport protocols such as ATM, Ethernet, and SONET. The primary advantage of this MPLS VPN type is that it can transparently replace an existing dedicated facility without reconfiguration, and that it is completely agnostic to upper-layer protocols. By contrast, in a layer 3 VPN the hosts must speak IP.

DETAILED DESCRIPTION

Throughout this description, the embodiments and examples shown should be considered as exemplars, rather than limitations on the apparatus and methods disclosed or claimed.

Description of Systems

Figure 1:
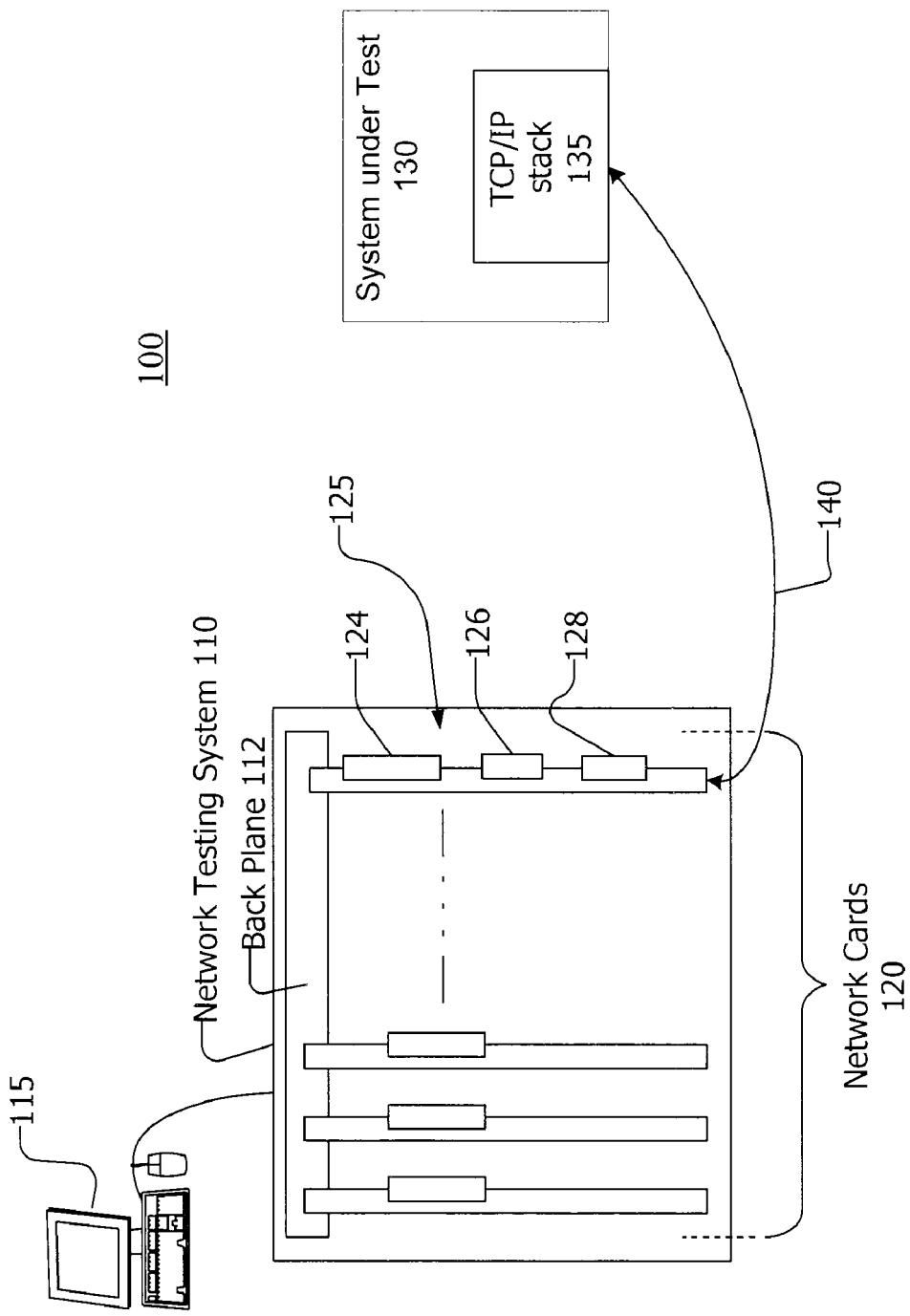
FIG. 1 is a functional block diagram of a testing environment.

Referring now to FIG. 1 there is shown a functional block diagram of a testing environment 100. The testing environment 100 includes a testing system 110 and a system under test (SUT) 130, coupled with a communications medium 140. The testing system 110 may be located physically adjacent to and/or remote to the SUT 130. The testing environment 100 may include additional systems, devices and apparatuses.

The testing system 110 may include or be one or more of a performance analyzer, a conformance validation system, a network analyzer, a packet blaster, a network management system, a combination of these, and/or others. The testing system 110 may be used to evaluate and/or measure characteristics and performance of the SUT 130, including the throughput of traffic, the number of dropped data units, jitter, and many others. The testing system 110 may be in the form of a chassis or card rack, as shown in FIG. 1, or may be an integrated unit. Alternatively, the testing system 110 may comprise a number of separate units such as two or more chassis, personal computers, servers, or workstations. The testing system 110 may be used alone or in conjunction with one or more other testing systems.

The SUT 130 may be one or more of a communication line, a communication system, a server, a routers, a gateway, server load balancer, a load sharer, an application program and other hardware, software, devices and systems. The SUT 130 may include a TCP/IP stack 135 for implementing full TCP/IP communications capabilities or other protocol stack. By "full TCP/IP communications capabilities", it is meant that the TCP/IP stack implements the full TCP protocol, including timeouts, retransmissions, flow control, etc. The TCP protocol that may be implemented by the TCP/IP stack is described in IETF RFCs 675, 761 and 793. The IP protocol that may be implemented by the TCP/IP stack is described in IETF RFCs 760 and 791.

The communications medium 140 may be, for example, wire lines such as an Ethernet cable, fiber optic cable, and coaxial cable, and may be wireless. The communications medium 140 may be a local area network (LAN), a wide area network (WAN), a storage area network (SAN), or a combination of these. The communications medium 140 may include or be the Internet. To accommodate multiple testing cards 120, communications medium 140 may include multiple connections and/or separate media between the testing system 110 and the SUT 130. The communications medium 140 may be public or private, may be a segregated test network, may be packet switched or circuit switched, and may be a combination of these. The communications medium 140 may be comprised of a single or numerous nodes providing numerous physical and logical paths for data units to travel.

Communications through the communications medium 140 may take various forms, including frames, cells, datagrams, data units, higher level logical groupings of data, or other units of information, all of which are referred to herein as data units. In IP and many other network protocols, data units include the network address (e.g., IP address) of the originator, the network address of the recipient, a payload, and other parts. A logical collection of data units that are communicated over a network are referred to herein as network traffic. The network traffic may include data units that represent electronic mail messages, computer files, web pages, graphics, documents, audio and video files, streaming media such as music (audio) and video, telephone (voice) conversations, and others.

The testing system 110 may include one or more testing cards 120 and a backplane 112. The testing cards 120 may be coupled with the backplane 112. The testing cards 120 may be permanently installed in the testing system 110, may be removable, or may be a combination thereof. The testing cards 120 may include one or more test ports 125. The backplane 112 may serve as a bus or communications medium for the testing cards 120. The backplane 112 may also provide power to the testing cards 120.

The term testing card as used herein encompasses line cards, test cards, analysis cards, network line cards, load modules, interface cards, network interface cards, data interface cards, data unit engine cards, service cards, smart cards, switch cards, relay access cards, CPU cards, port cards, and others. The testing cards 120 may be referred to as blades, particularly when a processor is included on the network card.

Each test port 125 includes a processor 124, a memory 126 and a network communications unit 128. The test port 125 may include an operating system such as, for example, versions of Linux, Unix and Microsoft Windows running on the processor 124. By test port it is meant a generic device which includes a network interface for sending and receiving data units, and includes a processor for creating data units to transmit and for processing received data units. In practice, a test port will typically include additional components, and the test port 125 is representative.

The test port 125 may support one or more well known higher level communications standards or protocols such as, for example, one or more versions of the User Datagram Protocol (UDP), Transmission Control Protocol (TCP), Real-Time Transport Protocol (RTP), Internet Protocol (IP), Internet Control Message Protocol (ICMP), Internet Group Management Protocol (IGMP), Session Initiation Protocol (SIP), Hypertext Transfer Protocol (HTTP), address resolution protocol (ARP), reverse address resolution protocol (RARP), file transfer protocol (FTP), Simple Mail Transfer Protocol (SMTP); may support one or more well known lower level communications standards or protocols such as, for example, the 10 and/or 40 Gigabit Ethernet standards, the Fibre Channel standards, one or more varieties of the IEEE 802 Ethernet standards, Sonet, CDMA, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), Bluetooth; may support proprietary protocols; and may support other protocols. Each test port may support a single communications protocol, may support a number of related protocols, or may support a number or combination of unrelated protocols.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols in hardware. The network communications unit 128 may include the network interface through which the test port 125 may transmit and/or receive communications over the communications medium 140.

The testing system 110 may be controlled in numerous ways. For example, a computer 115 may be coupled directly or indirectly to the testing system 110, either local to or remote from the testing system 110. The testing system 110 may include a CPU on a card, motherboard or the backplane 112 that allows the testing system 110 to also serve as a computer workstation, or to work with a terminal connected thereto.

The hardware and firmware components of the testing system 110, including the testing cards 120, may include various specialized units, circuits, software and interfaces for providing the functionality and features described here. The invention may be embodied in whole or in part in software and take the form of firmware, an application program, an applet (e.g., a Java applet), a browser plug-in, a COM object, a dynamic linked library (DLL), a script, one or more subroutines, a device driver, or an operating system component or service. The hardware and software of the invention and its functions may be distributed.

Figure 2:
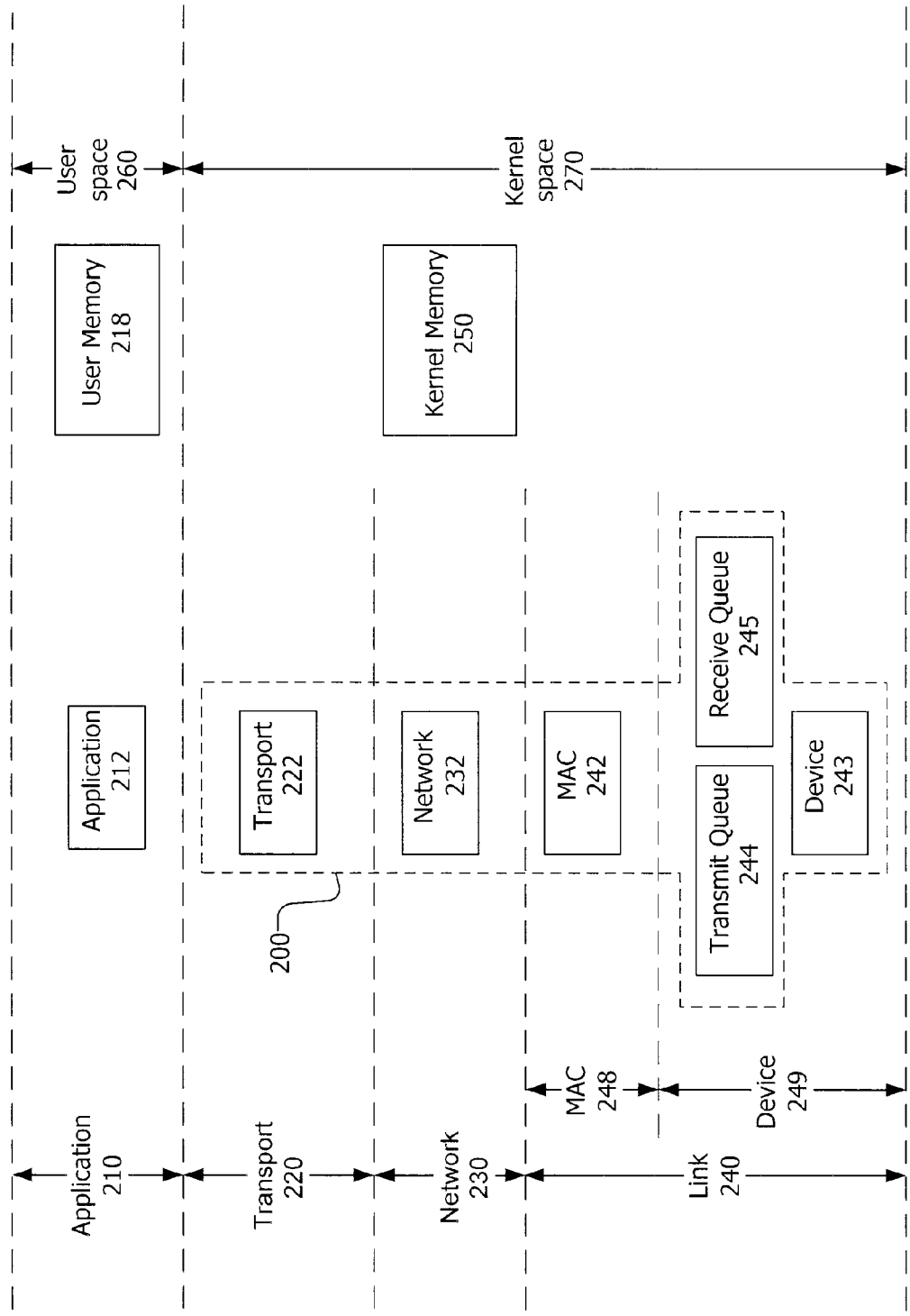
FIG. 2 is a diagram of a logical arrangement of a test port.

Referring now to FIG. 2, there is shown a diagram of a logical arrangement of a test port, such as the test port 125 of FIG. 1. The logical arrangement is defined by a user space 260 and a kernel space 270. The test port is logically divided into four interfaced layers 210, 220, 230, 240, which in FIG. 2 are demarcated by horizontal dashed lines. Data units are created at the higher layers and logically passed down to the lower layers for transmission. Data units are received at a lowest layer and logically passed up to and processed by succeeding higher layers.

The application layer 210 is in user space 260. The other layers 220, 230, 240 are in kernel space 270. Within kernel space 270 there is a protocol stack 200 and a kernel memory 250. The protocol stack 200 may use the kernel memory 250 for accessing, managing and operating on data units.

Within the application layer 210, there may be an application unit (e.g., a program) 212 and a user memory 218. The application unit 212 forms application data into payload data of data units to be transmitted, and removes payload data from received data units. The user memory 218 is used by the application unit 212 for storing payloads and data units.

The protocol stack 200 has the three layers: a transport layer 220, a network layer 230 and a link layer 240. The protocol stack 200 runs entirely in kernel space 270. For each layer 220, 230, 240 there may be a corresponding processing unit (software and/or hardware), memory constructs and data constructs. The protocol stack 200 has both transmit and receive capabilities, though this is not required of all protocol stacks.

Within the transport layer 220, there is a transport unit 222. The transport unit 222 forms transport headers for transmission and interprets received transport headers.

Within the network layer 230, there is a network unit 232. In a TCP/IP protocol stack, the network protocol is IP. The network unit 232 forms network headers.

The link layer 240 may be viewed as having a MAC layer 248 and a device layer 249 as separate layers or sub-layers. Within the link layer 240, there is a media access control (MAC) unit 242, a device 243, a transmit queue 244, and a receive queue 245. The comprising MAC unit 242, the device 243, the transmit queue 244 and the receive queue 245 may together be viewed as a link unit. The MAC unit 242 forms MAC headers for transmission and interprets received MAC headers. The MAC header may be an Ethernet header, though other protocols may be used, such as ATM and Sonet. The device 243 frames and transmits data units, and receives and de-frames data units. The transmit queue 244 may store references to data units to be transmitted and priorities for processing by the device 243. The receive queue 245 may store references to received data units and priorities for processing by the device 243. The device 243 may be or have hardware for assembling data units.

The operation of the TCP/IP stack 135 of the SUT 130 (FIG. 1) can be contrasted with at least some operations of the protocol stack 200. The test port may simulate TCP/IP communications in a stateless manner. By simulate, it is meant that the communications from the test port imitate real communications by representing certain key characteristics or behaviors while omitting other characteristics or behaviors which would be found in real communications. By stateless, it is meant that the test port makes response decisions based only on information contained in an inbound data unit. By stateful, it is meant that the test port makes response decisions based on its memory of previously transmitted and/or received data units. Accordingly, for stateless traffic generation, the test port might not implement any of the stateful procedures implemented by the SUT's TCP/IP stack. For example, for stateless traffic generation, the test port might not implement flow control or retransmissions.

The test port may also include filters for filtering data received on stateless and stateful connections. For example, the filters may contain tables that associate IP addresses with stateless and stateful connections. When a packet is received over one of the connections, based on the connection tables the filters may determine whether to send the packets to the protocol stack (e.g., for stateful traffic) or the network communications unit (e.g., for stateless traffic) or to discard them (e.g., for stateless traffic).

Additional and fewer units, modules or other arrangement of software, hardware and data structures may be used to achieve the systems and devices described herein.

Description of Processes

Figure 3:
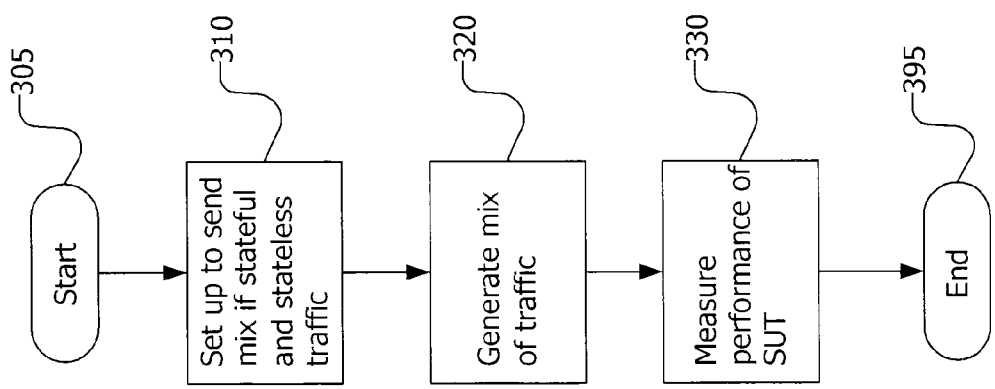
FIG. 3 is a flow chart of a process for testing performance of a system under test.

Referring now to FIG. 3, there is shown a flow chart of a process for testing performance of a system under test. The process may be performed using the testing environment of FIG. 1 and/or the protocol stack of FIG. 2. The flow chart has both a start 305 and an end 395, but the process is cyclical in nature.

After the process begins 305, the test port sets up for generating a mix of stateful and stateless traffic to the system under test (step 310). This step 310 may include establishing a plurality of simulated stateful connections with the SUT, and establishing a plurality of simulated stateless connections with the SUT. This mix may involve, for example, running stateful L4-L7 traffic over routes advertised by stateful connections used to exchange routing information. In conjunction with setting up (step 310), a user may load a previously stored profile, or configure a new profile, which defines endpoints. The user may then select stateful pairs, name the traffic item, see a visual representation of the traffic item, and apply stateful and stateless traffic into the profile.

Next, the test port may generate the mix of stateful and stateless traffic to the system under test (step 320). Starting and stopping traffic may be under a user's control, and the user may be provided with statistics and other information about the traffic. This step 320 may include both creating and sending data units to the SUT, and receiving data units, over the simulated stateless and stateful connections. The simulated traffic may be triple-play, that is, a combination of data, voice and video. The nature and qualities of the simulated stateful and stateless traffic may be configured as appropriate or desired for the SUT and the nature of the test.

Through the simulated stateful and stateless traffic generated by the test port, the test port may engage in transactions with the SUT, and these transactions result in additional traffic. These transactions may be considered part of the generated traffic. A transaction is a group of two or more actions which form logical group of operations that, to be successful, must all succeed or fail as a group The data units sent and received by the test port may have various formats. The data units may include a source address and a destination address, a payload, and other fields. Labels may be applied to some of the data units. Performance of the SUT under load of the traffic from the test port may be measured (step 330).

The process is not limited to a single test port. That is, it may be desirable to test the SUT by having simulated traffic between the SUT and some number of test ports. Accordingly, for a second test port, a mix of stateful and stateless traffic can be set up and then generated. The simulated stateful connections and/or the stateless connections may be established separately by the test ports. Furthermore, the test ports may operate simultaneously or sequentially to generate their respective traffic with the SUT. By simultaneous, it is meant that there is some overlap in time of starting and stopping of the ports' traffic. By sequential, it is meant that there is no such overlap, but that the stopping of one test port's traffic is followed closely in time by the starting of another test port's traffic.

To operate efficiently or for other reasons, the test port may filter out stateless traffic coming from the SUT. This may permit the test port to apply its resources to the simulated stateful traffic and to other processing.

Generating both simulated stateful and stateless traffic from a single test port is a considerable advancement over the systems and methods used in the past, where simulated stateful and stateless traffic were generated by a number of test ports and then combined in a single test port for transmission to the SUT. Typically, one set of test ports acted like edge devices (e.g., PCs), and another test port acted like a router, with the simulated edge traffic being directed within the testing system through the simulated-router test port to the SUT. Using the process of FIG. 3, a single test port may appear to be both a number of edge devices and the router, with origination addresses (e.g., origination IP addresses) configured accordingly. That is, the test port may be designated by a single IP address so that it looks like a router, but also one or more ranges of addresses may also be associated with the test port so that it also looks like a group of edge devices behind the router, so that all traffic destined for those associated addresses is handled by the test port.

This advancement is even more pronounced when more complex types of traffic are being generated. For example, the transmitted and received data units of the traffic between the test port and the SUT may include data units encapsulated with labels, such as LDP labels, RSVP-TE labels, or MP-BGP labels. The simulated stateful traffic and simulated stateless traffic may be MPLS traffic and/or layer 3 VPN traffic, with appropriate encapsulation and labels as managed by the test port.

Although it may be possible to manage the labels at the application layer, it has been found that particular benefits are obtained by managing labels within the test port's kernel. The kernel is a central part of an operating system which manages the operating system's resources and the communication between hardware and software components. As a basic component of an operating system, a kernel provides abstraction layers for hardware, especially for memory, processors and I/O that allows hardware and software to communicate. It also provides software facilities to user and applications such as process abstractions, inter-process communication and system calls. The kernel may process the labels of incoming data units by matching the destination address to the stateless and stateful traffic generated by the test port.

A test port performing these processes may have the logical arrangement shown in FIG. 2. The application unit may generate the simulated stateful traffic. The network unit may generate the simulated stateless traffic. The link unit may manage the labels on transmitted and received data units. The label distribution protocols signal the labels used. The labels are passed to the kernel's link layer manager module, so that subsequent data units retain the correct label for transmission, and multiplex the data units properly on receipt. Both simulated stateful and stateless data units may be encapsulated with labels.

Managing the labels merits some discussion. To support the link unit, there may be a database of labels information stored in the kernel memory. The link unit may use the database in encapsulating transmitted data units and in decapsulating received data units. The labels database may have a number of records corresponding to labels in received and transmitted data units. The database may have fields for a destination (IP) address, a label, a peer (IP) address of a protocol session that received the label, and a priority. The labels database may have additional fields, such as family type. The family type may be, for example, IPv4 or IPv6. The database may be populated with learned labels, i.e., learned by analyzing real traffic.

In accordance with the systems and processes disclosed, it is possible to have multiple MPLS tunnels from a single test port to a SUT. By indexing each tunnel by source device and destination address, multiple MPLS tunnels can coexist on a single test port. It also allows multiple source IPs to transmit over the same tunnel.

Each MPLS tunnel may be defined by five attributes: an interface, a destination prefix, a nexthop address, a label, and a priority. The interface specifies the output network device for which an MPLS tunnel definition is valid. Only packets transmitted via this interface will be encapsulated. Note that this can include packets which originate from other tunnel interfaces such as unconnected and GRE interfaces. The destination prefix specifies the destination addresses of packets that will be encapsulated in the MPLS tunnel. The nexthop address specifies the intermediate destination of MPLS packets. It serves two purposes. On Ethernet interfaces, it is used to determine the destination MAC of MPLS encapsulated packets. On unconnected interfaces, it serves as the destination address for determining whether or not stacked MPLS labels should be assigned. Finally, the priority determines which MPLS label to use if multiple definitions contain the same interface and destination prefix. Higher priorities correspond to larger numerical values.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A process for testing performance of a system under test, the process comprising:
   setting up for generating simulated stateful and stateless traffic from a first test port to the system under test; and
   generating the simulated stateful and stateless traffic from the first test port to the system under test.

2. The process for testing performance of a system under test of claim 1 wherein the simulated traffic includes data units encapsulated with labels which are LDP labels, RSVP-TE labels, or MP-BGP labels.

3. The process for testing performance of a system under test of claim 2 wherein the test port has a kernel, the process further comprising the kernel managing the labels on transmitted and received data units.

4. The process for testing performance of a system under test of claim 3, wherein at least some of the data units include destination IP addresses, the process further comprising the kernel processing the labels of incoming data units by matching the destination IP address to the stateless and stateful traffic generated by the first test port.

5. The process for testing performance of a system under test of claim 1 further comprising:
   setting up for generating simulated stateful and stateless traffic from a second test port to the system under test; and
   generating the simulated stateful and stateless traffic from the second test port to the system under test.

6. The process for testing performance of a system under test of claim 1 further comprising:
   engaging in transactions with the system under test through the first test port, wherein the transactions result in additional traffic.

7. The process for testing performance of a system under test of claim 1 further comprising:
   measuring performance of the system under test under load of the traffic from the first test port.

8. The process for testing performance of a system under test of claim 1 further comprising:
   the first test port filtering out stateless traffic received from the system under test.

9. A process for testing performance of a system under test, the process comprising:
   establishing a plurality of simulated stateful connections with a system under test;
   establishing a plurality of simulated stateless connections with the system under test; and
   a first test port both generating data units and sending the generated data units to the system under test over the simulated stateless and simulated stateful connections.

10. The process for testing performance of a system under test of claim 9 further comprising:
    a second test port both generating data units and sending the generated data units to the system under test over the simulated stateless and stateful connections.

11. The process for testing performance of a system under test of claim 10 wherein establishing the simulated stateful connections and establishing the simulated stateless connections are performed separately by the first test port and the second test port.

12. The process for testing performance of a system under test of claim 11 wherein the first test port generating and the second test port generating occur simultaneously.

13. The process for testing performance of a system under test of claim 11 wherein the first test port generating and the second test port generating occur sequentially.

14. A protocol stack comprising a plurality of interfaced layers in which data units are received at a lowest layer and logically passed up to and processed by succeeding higher layers, and data units are created at the higher layers and logically passed down to the lower layers for transmission, the protocol stack comprising:
    an application unit logically disposed in an application layer, the application unit for generating simulated stateful traffic comprising plural data units;
    a network unit logically disposed in a network layer which is disposed below the application layer, the network unit for generating simulated stateless traffic comprising plural data units; and
    a link unit logically disposed in a link layer which is disposed below the network layer, the link module comprising software for managing labels on transmitted and received data units.

15. The protocol stack of claim 14 further comprising:
    a database of information for use by the link unit in encapsulating transmitted data units with labels and in decapsulating labels from received data units.

16. The protocol stack of claim 15 wherein the database comprises record shaving fields comprising a destination network address, a label, a peer network address of a protocol session that received the label, a priority.

17. The protocol stack of claim 16 wherein the records in the database further have fields comprising family type, and the family type is selected from the group comprising Ipv4 and Ipv6.

18. The protocol stack of claim 14 wherein the labels are one or more of LDP labels, RSVP-TE labels, and MP-BGP labels.

19. The protocol stack of claim 14 wherein the application unit comprises an application program and the network unit is comprised of an FPGA.

20. The protocol stack of claim 14 further comprising software for generating MPLS traffic.

21. The protocol stack of claim 14 further comprising software for generating layer 3 VPN traffic.

22. An apparatus for testing performance of a system under test, the apparatus comprising:
    a first test port comprising:
       means for setting up for generating simulated stateful and stateless traffic from a first test port to the system under test; and
       means for generating the simulated stateful and stateless traffic from the first test port to the system under test.

23. The apparatus for testing performance of a system under test of claim 22 wherein the simulated traffic includes data units encapsulated with labels which are LDP labels, RSVP-TE labels, or MP-BGP labels.

24. The apparatus for testing performance of a system under test of claim 23 wherein the first test port has a kernel for managing the labels on transmitted and received data units.

25. The apparatus for testing performance of a system under test of claim 24, wherein at least some of the data units include destination IP addresses the kernel further for processing the labels of incoming data units by matching the destination IP address to the stateless and stateful traffic generated by the first test port.

26. The apparatus for testing performance of a system under test of claim 22 further comprising:
   a second port comprising:
      means for setting up for generating simulated stateful and stateless traffic from the second test port to the system under test; and
      means for generating the simulated stateful and stateless traffic from the second test port to the system under test.

27. The apparatus for testing performance of a system under test of claim 22 further comprising:
   means for measuring performance of the system under test under load of the traffic from the first test port.

28. The apparatus for testing performance of a system under test of claim 22, the first test port further comprising:
   means for filtering out stateless traffic received from the system under test.

29. An apparatus for testing performance of a system under test, the apparatus comprising:
   means for establishing a plurality of simulated stateful connections with a system under test; and
   means for establishing a plurality of simulated stateless connections with the system under test; and
   a first test port for both generating data units and sending the generated data units to the system under test over the simulated stateless and simulated stateful connections.

30. The apparatus for testing performance of a system under test of claim 29 further comprising:
   a second test port for both generating data units and sending the generated data units to the system under test over the simulated stateless and stateful connections.

31. The apparatus for testing performance of a system under test of claim 30 wherein the first port and the second port include respective means for establishing the simulated stateful connections and establishing the simulated stateless connections.

32. The apparatus for testing performance of a system under test of claim 30 wherein the first test port the second test port can generate traffic simultaneously.

33. The apparatus for testing performance of a system under test of claim 30 wherein the first test port and the second test port can generate traffic sequentially.

34. A process for using a protocol stack, the protocol stack comprising a plurality of interfaced layers in which data units are received at a lowest layer and logically passed up to and processed by succeeding higher layers, and data units are created at the higher layers and logically passed down to the lower layers for transmission, the process being executed on a computer containing at least one processor, wherein the process comprises:
   executing an application unit which generates simulated stateful traffic comprising plural data units, wherein the application unit is logically disposed in an application layer;
   executing a network unit which generates simulated stateless traffic comprising plural data units, wherein the network unit logically disposed in a network layer which is disposed below the application layer; and
   executing a link module which manages labels on transmitted and received data units, wherein the link unit is logically disposed in a link layer which is disposed below the network layer.

35. The process of claim 34 further comprising:
   providing a database of information, wherein the link unit uses the database of information in encapsulating transmitted data units with labels and in decapsulating labels from received data units.

36. The process of claim 35 wherein the database comprises records having fields comprising a destination network address, a label, a peer network address of a protocol session that received the label, a priority.

37. The process of claim 36 wherein the records in the database further have fields comprising family type, and the family type is selected from the group comprising Ipv4 and Ipv6.

38. The process of claim 37 wherein the labels are one or more of LDP labels, RSVP-TE labels, and MP-BGP labels.

39. The process of claim 34 further comprising generating MPLS traffic.

40. The process of claim 34 further comprising generating layer 3 VPN traffic.

41. An apparatus for testing performance of a system under test, the apparatus comprising:
   a processor and a memory; and
   a first test port comprising:
      an application unit in user space for generating simulated stateful traffic from the first test port to the system under test;
      a networking unit in kernel space for generating simulated stateless traffic from the first test port to the system under test; and
      a kernel for encapsulating and decapsulating at least some of the simulated traffic with labels.

42. The apparatus for testing performance of a system under test of claim 41, wherein the kernel further comprises filtering out stateless traffic received from the system under test.

43. The apparatus for testing performance of a system under test of claim 41, wherein at least some of the data units include destination IP addresses; and
   the kernel further comprises processing the labels of incoming data units by matching the destination IP address to the stateless and stateful traffic generated by the first test port.

44. The apparatus for testing performance of a system under test of claim 41 further comprising:
   a second port comprising:
   an application unit in user space for generating simulated stateful traffic from the first test port to the system under test;
   a networking unit in kernel space for generating simulated stateless traffic from the first test port to the system under test; and
   a kernel for encapsulating and decapsulating at least some of the simulated traffic with labels.

45. The apparatus for testing performance of a system under test of claim 44 wherein the first test port the second test port can generate traffic simultaneously.

46. The apparatus for testing performance of a system under test of claim 44 wherein the first test port and the second test port can generate traffic sequentially.

* * * * *

UNITED STATES PATENT AND TRADEMARK OFFICE
CERTIFICATE OF CORRECTION

PATENT NO. : 7,516,216 B2  Page 1 of 1
APPLICATION NO. : 11/462351
DATED : April 7, 2009
INVENTOR(S) : Ginsberg et al.

It is certified that error appears in the above-identified patent and that said Letters Patent is hereby corrected as shown below:

Column 10, line 37 claim 16: replace "record shaving" with --records having--

Column 10, line 42 claim 17: replace "Ipv4" with --IPv4--

Column 10, line 43 claim 17: replace "Ipv6" with --IPv6--

Column 12, line 18 claim 37: replace "Ipv4" with --IPv4--

Column 12, line 19 claim 37: replace "Ipv6" with --IPv6--

Signed and Sealed this

Twenty-sixth Day of May, 2009

JOHN DOLL
*Acting Director of the United States Patent and Trademark Office*